Feb. 16, 1932. E. T. J. TAPP 1,845,854
SELF PROPELLED ROAD VEHICLE
Filed July 3, 1931
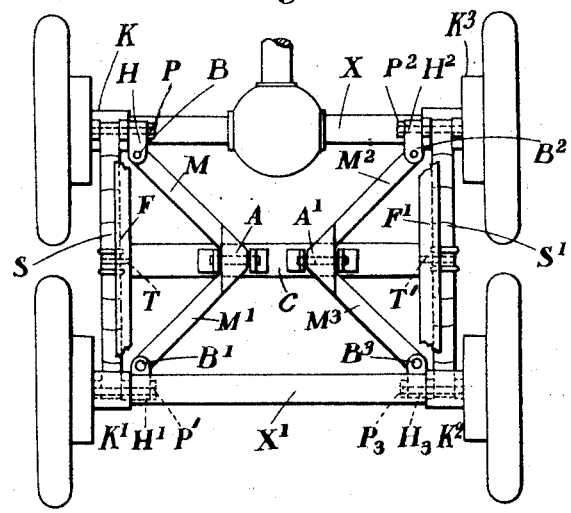
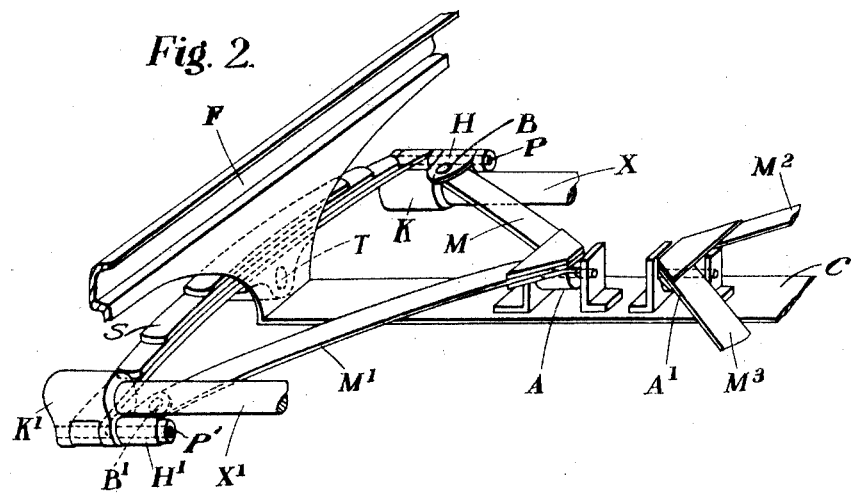
INVENTOR
Ernest T. J. Tapp.
BY
William C. Sinton.
ATTORNEY Patented Feb. 16, 1932

1,845,854

UNITED STATES PATENT OFFICE

ERNEST THOMAS JAMES TAPP, OF LONDON, ENGLAND

SELF-PROPELLED ROAD VEHICLE

Application filed July 3, 1931, Serial No. 548,663, and in Great Britain April 12, 1930.

This invention relates to self-propelled road vehicles and has for its object to provide a simple and effective means of reinforcing the springs of the rear axle or axles so as to relieve the said springs and their attachments of certain lateral strains without in any way interfering with their normal function of absorbing road shocks.

The invention relates more particularly to that type of laminated spring which is anchored to the frame by a trunnion mounting, as is employed, for example, in the system frequently adopted for the two rear axles of a rigid frame 6-wheel vehicle in which one or more springs are provided at each side and attached to the frame at or near the centres by a trunnion mounting, the axles being attached to the spring extremities.

In this type of vehicle, that is, wherein one or more springs is or are employed at each side to couple the two axles together and a trunnion mounting at or near the centres of said springs for the purpose of anchoring said spring or springs to the frame; it is well known that unequal lateral forces on the axles impose severe stresses on the springs and trunnion mounting, and it is these stresses which the present invention seeks to eliminate.

To this end therefore, in self-propelled road vehicles having springs of the type which are secured to the vehicle frame by a trunnion mounting and attached to an axle at each extremity, I provide members attached to and extending from both extremities of each spring to a swivel mounting disposed nearer the chassis longitudinal centre line than the spring trunnion, each swivel mounting being adapted to rock independently on or near the same axis line as the spring trunnions themselves.

The said members may be of spring material and be curved to correspond with the main spring leaf to which they are attached so that in flexing under load variations or road inequalities, they vary in length and curvature in unison with the said main spring leaf.

The main leaf of the spring, in conjunction with the said members, may form a triangle which is free to rock or rotate about an axial line extending from the spring trunnion to the swivel at the apex.

The invention will now be described with reference to the accompanying drawings, in which Figure 1 is a plan view of one form of the invention fitted to a three axle vehicle of the type in which the two rear axles are coupled by a single spring each side and attached to the frame by a trunnion mounting, and Figure 2 is a perspective view thereof, and in this view, for convenience, the construction of one side only is shown.

S, S1 are the springs attached to the frame F, F1, portions only of which are shown, by the trunnion mounting shown dotted at T, T1.

M, M1, M2 and M3, are the members joining the spring extremities to the swivel mountings A, A1, at the apex of the triangle formed by them with the spring. It will be noticed that the trunnions T, T1, and the portion of the frame to which they are attached protrude within the triangle so formed. The members M, M1, M2 and M3, are preferably of spring steel and curved so as to conform to the curvature of the main spring leaf to the extremities of which they are attached.

The swivel mountings A and A1 are supported on a suitably arranged cross member C.

The outer ends of the members M, M1, M2 and M3, are joined to the spring extremities by separate hinge end pieces H, H1, H2 and H3, which are attached to the said members by the bolts or pins B, B1, B2 and B3, and to the spring extremities by pins P, P1, P2 and P3, which also serve to anchor the spring to the axles X and X1 by the medium of the shackles K, K1, K2 and K3.

Since the swivel pins at A, A1, are in line, or approximately so, with the trunnion T, they may, if necessary, be made in one bar extending across the chassis, in which case it may be of such strength and proportion as to render the cross member C unnecessary.

If it is desired to use two springs each side, the members M, M1, M2, M3 and springs may be duplicated accordingly. It may, however, be sufficient to reinforce one of the pair of springs only.

The invention above described may be utilized in conjunction with the frame construction described and claimed in my prior United States specification Serial No. 439,498, filed March 27th, 1930.

What I claim is:—

1. In a road vehicle, a frame, a pair of rear axles, springs secured to said axles, trunnion mountings on said frame and connected to said springs, a pair of spring members extending from the extremities of each of the springs, swivel mountings, each engaging a pair of said members and disposed nearer the frame longitudinal center line than the spring trunnion, each swivel mounting being adapted to rock longitudinally on or near the same axis as the spring trunnions themselves.

2. In a road vehicle, a frame, a pair of rear axles, springs secured to said axles, trunnion mountings on said frame and connected to said springs, members extending from both extremities of said springs, swivel mountings engaging said members and disposed nearer the frame longitudinal center line than the spring trunnion, each swivel mounting being adapted to rock longitudinally on or near the same axis as the spring trunnions themselves, said members being composed of spring material and being curved to correspond with the main spring leaf to which they are attached so that in flexing under load variation or road inequalities, they vary in length and curvature in unison with said main spring leaf.

3. In a road vehicle, a frame, a pair of rear axles, springs secured to said axles, trunnion mountings on said frame and connected to said springs, members extending from both extremities of said springs, swivel mountings engaging said members and disposed nearer the frame longitudinal center line than the spring trunnion, each swivel mounting being adapted to rock longitudinally on or near the same axis as the spring trunnions themselves, said members being composed of spring material and being curved to correspond with the main spring leaf to which they are attached, said members, in conjunction with the main leaf spring, forming a triangle with the main spring trunnion and that portion of the frame to which it is attached, accommodated within the said triangle.

4. In a road vehicle, a frame, a pair of rear axles, springs secured to said axles, trunnion mountings on said frame and connected to said springs, a pair of spring members arranged between the ends of each spring and the frame, swivel mountings securing each end of said springs to said members, other swivel mountings disposed nearer the frame longitudinal center line than the spring trunnion and each interconnecting a pair of members with the frame, each swivel mounting being adapted to rock longitudinally on or near the same axis as the spring trunnions themselves.

In testimony whereof he affixes his signature.

ERNEST THOMAS JAMES TAPP.